United States Patent [19]
Takahama et al.

[11] 3,906,535
[45] Sept. 16, 1975

[54] CAMERA WITH INTERCHANGEABLE PARTS

[75] Inventors: Sho Takahama; Yoichi Hamada, both of Nishinomiya, Japan

[73] Assignee: Fuji Photo Film Co., Ltd., Minami-ashigara, Japan

[22] Filed: Oct. 16, 1973

[21] Appl. No.: 406,992

[30] Foreign Application Priority Data
Oct. 17, 1972  Japan................................ 47-103808

[52] U.S. Cl. ................................................ 354/288
[51] Int. Cl.² .......................................... G03B 17/02
[58] Field of Search . 95/11 R, 31 R, 31 AC, 31 FL, 95/31 FM, DIG. 1; 354/288

[56] References Cited
UNITED STATES PATENTS

| | | | |
|---|---|---|---|
| 446,368 | 2/1891 | Whitney | 95/31 R |
| 764,910 | 7/1904 | Brownell | 95/31 R |
| 2,378,406 | 6/1945 | Harris | 95/31 R |
| 2,484,510 | 10/1949 | Hutchison | 95/31 R |
| 2,622,496 | 12/1952 | Owens | 95/31 R |
| 2,927,518 | 3/1960 | Dörr | 95/31 R |
| 2,931,282 | 4/1960 | Owens | 95/31 AC |

*Primary Examiner*—Samuel S. Matthews
*Assistant Examiner*—Kenneth C. Hutchinson
*Attorney, Agent, or Firm*—Sughrue, Rothwell, Mion, Zinn and Macpeak

[57] ABSTRACT

A camera body separable into three parts, one part containing the movable mechanisms and another containing the stationary mechanisms.

2 Claims, 2 Drawing Figures

PATENTED SEP 16 1975　　3,906,535

CAMERA WITH INTERCHANGEABLE PARTS

BACKGROUND OF THE INVENTION

1. Field of the Invention

This invention relates to a photographic camera, and, more particularly, to a compact camera of simple construction with an interchangeable part including movable mechanisms.

2. Description of the Prior Art

In a photographic camera, the parts which tend to become out of order are predominantly located in the shutter mechanism, the film wind-up mechanism, the film counter and interlocking mechanism between these other mechanisms. On the other hand, difficulties seldom occur in the body portion of the camera containing a film feed chamber, a film take-up chamber, an aperture, a film guide and an optical system. In the conventional camera in which the movable parts tend become out of order and the stationary parts are combined together, repair of the camera is troublesome and, particularly in replacing the broken part, the cost of repair is quite high.

SUMMARY OF THE INVENTION

In view of the above-mentioned defects inherent in the conventional camera, the present invention provides a photographic camera separable into two parts one of which comprises the movable parts tending to become out of order and the other of which comprises the stationary parts not tending to become out of order.

In accordance with the present invention, it is possible to replace the broken part only without changing the other stationary parts of the camera by separating the broken part from the other part. Further, since the optical system is very expensive in comparison with the other parts of the camera, the cost of repairing the broken part by only replacing the broken part is quite economical. In addition, the photographic camera in accordance with this invention is particularly suitable for a system in which the camera is sold pre-loaded with a film, the film once exposed is sent along with the camera to a development laboratory for processing camera and the camera is returned to the user, because the movable parts of the camera tend to become out of order in such a system.

These and other objects, features and advantages of the present invention will be made apparent from the following detailed description of a preferred embodiment thereof taken in conjunction with the accompanying drawings.

BRIEF DESCRIPTION OF THE ACCOMPANYING DRAWINGS

FIG. 1 is an exploded view of the camera in accordance with the present invention, and FIG. 2 is a vertical sectional view of the camera in accordance with the present invention showing the internal construction thereof.

DETAILED DESCRIPTION OF THE INVENTION

Figure 1:
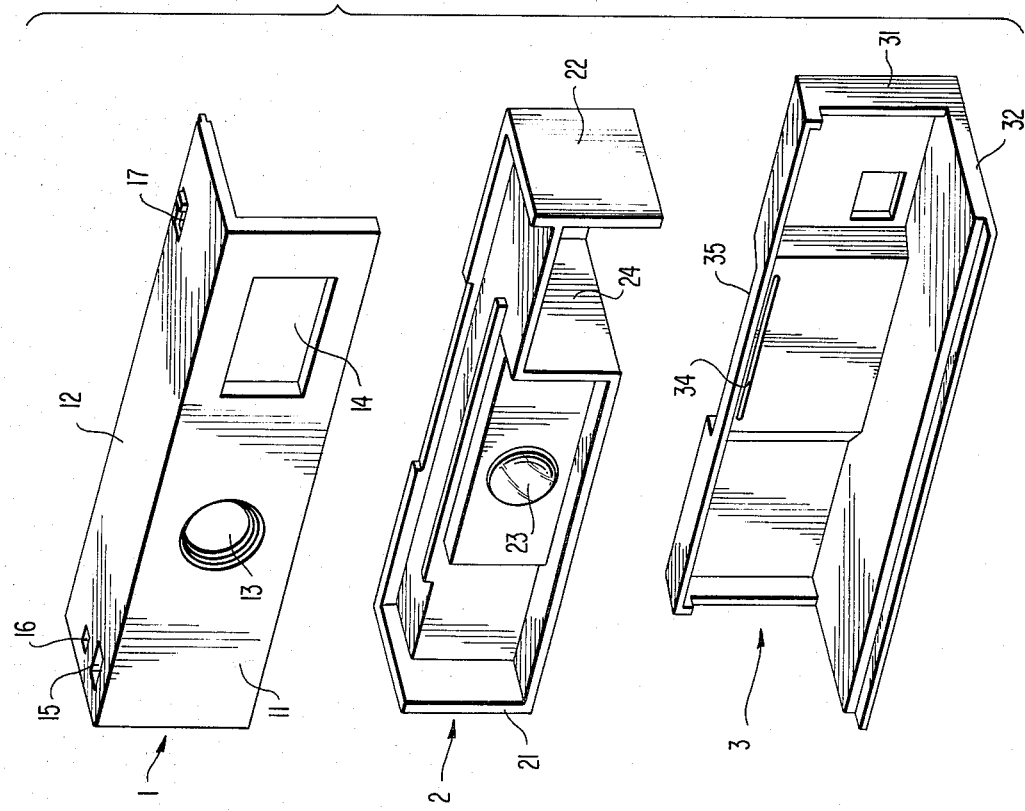

Referring to FIG. 1 which shows the camera of the invention in an exploded view, the camera body is divisible into three parts, one part of which is a first wall portion 1 of L-shape housing the movable mechanisms, another part of which is a an open rectangular body portion 2 including an optical system and other stationary parts, and the third part of which is a back cover portion 3 of L-shape. The above three parts 1, 2 and 3 can be made of a plastic and assembled together into a camera of a rectangular prism shape.

The wall portion 1 has a front wall section 11 and an integral top wall section 12. Behind the L-shaped wall portion are provided movable mechanisms such as a shutter, a film wind-up means, a film footage counter and an interlocking mechanism therefor. The front wall section 11 is provided with an aperture 13 for a taking lens and an opening 14 for a view finder. The top wall section 12 is provided with a shutter button 15, a window 16 for a film footage counter and a diaphragm control switch 17.

The body portion 2 is provided at the opposite ends thereof with rectangular end walls 21 and 22. A taking lens 23 is provided in the middle of the body portion 2, and a view finder optical system is placed in a space 24 adjacent the taking lens 23. Behind the taking lens 23 are provided a film feed out chamber and a film take-up chamber so that the film can be fed across the optical axis of the taking lens 23.

The back cover portion 3 has a bottom wall section 32 and an integral rear wall section 31 to form an L-shaped member. The rear wall section 31 is provided with an opening 33 for an eyepiece of the view finder optical system. The upper portion of the rear wall section 31 is provided with a slit 34 extending parallel to the bottom wall section 32 and a recess 35 is formed on the rear side of the rear wall section 31 at the slit 32.

The wall portion 1, the body portion 2 and the back cover portion 3 can be assembled together by fastening means such as tape, screws or other means allowing a separation of the camera into the parts.

Figure 2:
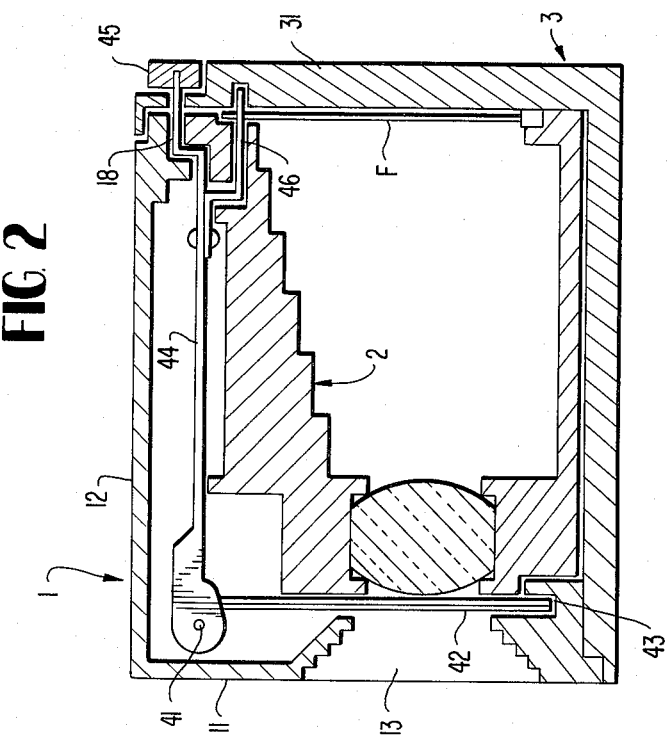

Referring now to FIG. 2, which shows the arrangement of the movable parts provided on the wall portion 1, a rail 41 is fixed to a part of the wall portion 1 and a shutter blade 42 and a capping plate 43 are made slidable along the rail 41 between the aperture 13 for the taking lens 23 and the taking lens 23. The capping plate 43 is integrally fixed to one end of a cocking plate 44 which extends along the top wall section 12 and is movable. The other end of the cocking plate 44 projects into the recess 35 of the rear wall section 31 through a slit 18 provided in the rear portion of the top wall section 12 and the slit 34 of the rear wall section 31 and is provided with a knob 45 for cocking the shutter and winding up the film. The knob 45 is removably mounted on the end of the cocking plate 44. The cocking plate 44 is further provided with a film feed claw 46 which is pivotally mounted to the cocking plate 44 and spring biased in one direction. The film feed claw 46 is further provided with a claw for rotating a film counter (not shown). In operation, by sliding the knob 45 of the cocking plate 44 along the recess 35 of the rear wall section 31, the film is wound up, the shutter is cocked and the film footage counter is rotated. Then, by depressing the shutter button 15, the shutter blade 42 is operated to run before the taking lens 23 resulting in exposure of the film F located between the body portion 2 and the back cover portion 3.

While the invention has been described in detail and with reference to specific embodiments thereof, it will be apparent to one skilled in the art that various changes and modifications can be made therein without departing from the spirit and scope thereof.

What is claimed is:

1. In a photographic camera having movable mechanisms including a shutter and film winding means, and stationary optical means including a taking lens and a view finder optical system, the improvement comprising:

a three part camera body, said body including a central body portion defined by rectangular end walls joined together by a vertical wall, a first L-shaped wall portion including integral right angle front wall and top wall sections whose widths generally correspond to the width and height of said end walls of said central body portion, and a second L-shaped wall portion, complementary to said first L-shaped wall portion and including integral right angle rear wall and bottom wall sections whose length and width correspond generally to those of said first L-shaped portion, said first and second L-shaped wall portions being engageable with said central body portion on opposite sides thereof with the edges of respective wall sections of said first and second L-shaped wall portions in confronting position and forming with said central body portion an assembly of rectangular prism shape with said vertical wall of said central body portion being parallel to and spaced from said front wall section of said first L-shaped wall portion, said first L-shaped wall portion having mounted thereto said camera movable mechanisms including said shutter and film winding means, said front wall section being provided with a taking lens aperture and a view finder opening, and said central body portion fixedly supporting said camera optical means with said vertical wall of said central body portion carrying said taking lens aligned with said taking lens aperture within said front wall section and said rear wall section being provided with an eyepiece opening in alignment with said view finder opening within said front wall section, and said view finder optical system being carried by said central body portion and in alignment with said eye piece opening of said rear wall section and said view finder opening within said front wall section.

2. The photographic camera as claimed in claim 1, further comprising: a shutter cocking means movably mounted within said first L-shaped wall portion including a pivotable cocking lever, a longitudinal slit within said rear wall section, one end of said cocking lever projecting through said slit and being provided with a removable knob at its outer end adjacent the rear wall section, and said cocking lever further including a film feed claw operatively coupled thereto and movable therewith for advancing a film in response to moving the end of said cocking arm projecting through said slit, longitudinally of said body.

* * * * *